United States Patent Office 2,766,885
Patented Oct. 16, 1956

2,766,885

PROCESS FOR CONCENTRATING KAINITE BY MEANS OF FLOTATION

Gerlando Marullo and Giovanni Perri, Milan, Italy, assignors to Montecatini, societa generale per l'Industria Mineraria e Chimica, a corporation of Italy No Drawing. Application February 5, 1954, Serial No. 408,591

Claims priority, application Italy February 10, 1953

5 Claims. (Cl. 209—166)

This invention relates to a novel process for concentrating kainite by means of flotation.

It is known that, in the past, kainite was used, either unmodified or after successive treatments, as the raw material in the preparation of potassium salts for agricultural purposes (kalimagnesia and potassium sulphate). However, kainite has gradually lost its importance and has been almost wholly replaced by sylvite (KCl) and kieserite ($MgSO_4H_2O$).

Aside from the fact that the working of the kainite deposits encountered technological difficulties due to the hazards occurring in phreatic layers, such deposits were also abandoned because the potassium salt, as a rule, is accompanied by rock salt, the removal of which involves not only technical but economical difficulties as well.

On the other hand, a direct use of crude kainite as a fertilizer is often undesirable because of the chlorine content of the rock salt. Aside from lowering the $K_2O$ percentage, an excess of chlorine is harmful for certain kinds of plants, in particular and generally in soils of areas where the rainfall is insufficient to lower the chlorine ratio in the soil by leaching.

In areas where there is an abundance of atmospheric precipitation, the dissipation of the crude salt appears to be fairly high; but in areas of little precipitation, such as Italy with the exception of some regions, the use of the crude salt is impossible because sodium chloride would accumulate in the soil due to insufficient rainfall.

Because of lack of foreign potassium salts, immediately after the last war, the attempt was made in Italy to introduce a raw kainite salt originating from a Sicilian mine. The drawbacks, however, were so great that the farmers were discouraged in further employing this salt.

It is known from pertinent literature that the removal of rock salt from kainite has been the subject of numerous studies and plans, but that on the whole no satisfactory solution of the problem has been found because of technological difficulties encountered with such a purification.

The separation of rock salt from the raw mineral is usually based on the extraction of the desirable salts by leaching. Such a process involves considerable expense for the required heat and, since the process is based on the chemical equilibrium of involved materials, the yields in $K_2O$ are low.

The operation depends upon the relative chlorine content of the crude mineral and, in case of a higher chlorine content, requires a greater volume of water to convert the kainite into products contaminated as little as possible by chlorine.

It is an object of this invention to provide a process for obtaining a pure kainite applicable for agricultural purposes without further modifications or as a raw material for manufacturing higher-grade potassium salts.

It is a particular aim of our invention to separate kainite crystals from those of the rock salt, mixtures of which form the Sicilian deposits, for example.

We made the unexpected discovery that, by means of a suitably conducted flotation process, a practically complete separation is obtained, and that kainite in a proportion higher than 96% is retained dispersed in the fluid portion, leaving a residue having a maximum content of only 1 to 1.5% $K_2O$.

We also discovered that a reconversion reaction between the residual salts and those suspended in the fluid portion can be avoided by operating with solutions having a high content of magnesium chloride, and that any dissolution of the salts forming the raw material is substantially prevented by the magnesium chloride.

It should be noted that, when the suitably ground raw mineral is introduced into water to form the turbid liquid to be brought to the flotation cells, salts contained in the raw mineral are not only dissolved but chemical reactions take place as well, one of them being the fundamental reaction whereby kainite is converted into schöenite according to the following formula:

$$2KCl.MgSO_4.3H_2O \rightarrow K_2SO_4.MgSO_4.6H_2O + MgCl_2$$

These reactions depend upon a number of factors, such as time, fineness of grind of the mineral, temperature, amount of circulating water, and others.

A flotation carried out with an unmodified solution fails not only with respect to efficiency of separation, but is also wasteful in the consumption of flotation agents. In contrast thereto, if solutions suitably buffered with magnesium chloride are employed, the above-mentioned drawbacks are entirely eliminated. We found that a solution with about 20% to about 40% of magnesium chloride is best suitable. When performing the flotation, for example, with a 30% solution of magnesium chloride, concentrates of constant percentage and yield are obtained.

Obviously, the process disclosed by this invention requires an adequate recovering of mother liquor.

A preferred variation of the flotation process of this invention comprises the following steps:

1. The raw mineral is ground either dry or wet in the buffer solution to a fineness of up to 500 to 600 mesh/cmq., preferably about 550 mesh/cmp.

2. A buffer solution as described above is added to prepare a turbid suspension with solid content, preferably of about 40%.

3. The turbid suspension is treated for several minutes with a flotation agent taken from the group of long-chain alkylamine acetates and is brought to flotation by gradually adding small amounts of amyl alcohol. The flotation is continued for about fifteen to twenty minutes until a frothy supernate is formed which, aside from the flotation liquid, has more than 90%, preferably 96 to 98%, kainite suspended therein. The flotation tails, viz. the solids remaining in the waste turbid suspension of the flotation apparatus, should have a $K_2O$ content of no more than 5%, preferably about 1 to 1.5%.

4. Concentrates and tails are separated from the liquid by filtration or centrifugation, and the clear liquid is recycled.

Unavoidable solution losses due to the moisture remaining in the filter cakes are replaced with fresh solution buffered with $MgCl_2$.

By operating in this manner, a product of a very high and uniform kainite content can be obtained, irrespective of the $K_2O$ content of the raw mineral.

The table below illustrates the results of three separation trials made according to the invention:

| | $KCl \cdot MgSO_4 \cdot 3H_2O$ in percent | Corresponding $K_2O$ in percent | NaCl in percent | $MgCl_2$ take-up; after centrif. in percent | $K_2O$ yields in percent |
|---|---|---|---|---|---|
| (a) | | | | | |
| Raw mineral | 26.5 | 5 | 73.5 | | |
| Floated | 95 | 17.9 | 3 | 2 | 84.7 |
| Residue | 5.3 | 1.0 | 92.7 | 2 | 15.3 |
| (b) | | | | | |
| Raw mineral | 42.3 | 8 | 57.7 | | |
| Floated | 96.0 | 18.15 | 2 | 2 | 92.5 |
| Residue | 7.9 | 1.5 | 90.1 | 2 | 7.5 |
| (c) | | | | | |
| Raw mineral | 66.3 | 12.5 | 33.7 | | |
| Floated | 96 | 18.15 | 2 | 2 | 97.3 |
| Residue | 7.9 | 1.5 | 90.1 | 2 | 2.7 |

Because of its solubility, the magnesium chloride contained in flotation concentrates is readily removable by washing with a very limited amount of water. Such a washing can be carried out in the final step of filtration.

From a consideration of the above-mentioned results, it will be apparent that this invention furnishes an economic method of separating kainite from rock salt, permitting the recovery of the former at very high yields.

We claim:

1. A process for separating substantially pure kainite from a crude mineral consisting substantially of kainite asociated with large amounts of rock salt, the said process comprising the steps of grinding the said crude mineral, mixing it with an amount of magnesium chloride solution sufficient to produce a turbid fluid, adding at least one long chain alkylamine acetate in an amount sufficient to produce flotation, agitating, adding gradually an amount of amyl alcohol sufficient to convert the turbid fluid into a frothy suspension, removing precipitated solids and separating from the said frothy suspension particles of substantially pure kainite.

2. A process for separating substantially pure kainite from a crude mineral consisting substantially of kainite associated with large amounts of rock salt, the said process comprising the steps of grinding the said crude mineral to a particle size of about 550 mesh/cmq., mixing it with an amount of magnesium chloride solution sufficient to produce a turbid fluid, adding at least one long chain alkylamine acetate in an amount sufficient to produce flotation, agitating, adding gradually an amount of amyl alcohol sufficient to convert the turbid fluid into a frothy suspension, removing precipitated solids and separating from the said frothy suspension particles of substantially pure kainite.

3. A process for separating substantially pure kainite from a crude mineral consisting substantially of kainite associated with large amounts of rock salt, the said process comprising the steps of grinding the said crude mineral to small particle size, mixing it with an amount of a 20 to 40% magnesium chloride solution sufficient to produce a turbid fluid, adding a long chain alkylamine-carboxylic acid compound sufficient to produce flotation, agitating, adding gradually an amount of amyl alcohol sufficient to convert the turbid fluid into a frothy suspension, removing precipitated solids and separating from the said frothy suspension particles of substantially pure kainite.

4. A process according to claim 3, in which the said magnesium chloride solution is 30% in strength.

5. A process for separating substantially pure kainite from a crude mineral consisting substantially of kainite associated with large amounts of rock salt, the said process comprising grinding the said crude mineral to small particle size in a magnesium chloride solution as grinding vehicle, adding a further amount of magnesium chloride solution sufficient to produce a turbid fluid containing 40% suspended solids, adding a long chain alkylamine-carboxylic acid compound in an amount sufficient to produce flotation, agitating, adding gradually an amount of amyl alcohol sufficient to convert the turbid fluid into a frothy suspension, continuing flotation for about fifteen to twenty minutes, removing precipitated solids, separating suspended particles, and recycling the clear liquid.

References Cited in the file of this patent

UNITED STATES PATENTS

| 2,088,325 | Kirby | July 27, 1937 |
| 2,288,497 | Tartaron et al. | June 30, 1942 |
| 2,340,613 | Perkins | Feb. 1, 1944 |
| 2,365,805 | Cole | Dec. 26, 1944 |
| 2,672,236 | Weinig | Mar. 16, 1954 |
| 2,687,339 | Dancy et al. | Aug. 24, 1954 |

FOREIGN PATENTS

Taggart: "Handbook of Mineral Dressing-Orcs Industrial Materials," published by John Wiley and Sons, New York, 1945, page 12–45. (Copy in Division 55.)